United States Patent
Yamaguchi et al.

(10) Patent No.: US 6,592,109 B2
(45) Date of Patent: Jul. 15, 2003

(54) LIQUID SEALING TYPE BODY MOUNT

(75) Inventors: Naoki Yamaguchi, Osaka (JP); Yoshitaka Ishimoto, Osaka (JP); Hiroyuki Takabayashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/898,821

(22) Filed: Jul. 3, 2001

(65) Prior Publication Data

US 2002/0038938 A1 Apr. 4, 2002

(30) Foreign Application Priority Data

Jul. 31, 2000 (JP) .......................... 2000-231588

(51) Int. Cl.⁷ ................................ F16M 9/00
(52) U.S. Cl. ................. 267/140.11; 267/141.2
(58) Field of Search ............... 267/140.11, 140.12, 267/140.13, 140.3, 140.4, 140.5, 141, 141.2, 141.3, 141.4, 141.5, 141.7; 248/562, 636, 638

(56) References Cited

U.S. PATENT DOCUMENTS 5,887,844 A * 3/1999 Fujiwara et al. ....... 267/140.11

FOREIGN PATENT DOCUMENTS

| JP | 62-188832   |   | 8/1987 |
|----|-------------|---|--------|
| JP | 62-209241 A | * | 9/1987 |
| JP | 63-199939 A | * | 8/1988 |
| JP | 2-38730     |   | 2/1990 |

* cited by examiner

Primary Examiner—Pam Rodriguez
(74) Attorney, Agent, or Firm—Jordan and Hamburg LLP

(57) ABSTRACT

A liquid sealing type body mount has a vibrating coefficient at 15 Hz frequency of about 4N·s/mm, and a moving spring constant at about 100 Hz reduced to about 1000N/mm to provide vibration isolation. The liquid sealing type body mount comprises an inner cylinder fixed to one of a body and a frame on the support side, an outer cylinder fixed to the other of them, a rubber elastomer provided between the inner and outer cylinders, two liquid chambers, and an orifice passage communicating the liquid chambers with each other, in which the load of the body is input in the axial direction. End walls of both the liquid chambers are formed of a rubber film extending aslant and outward in the axial direction from the inner cylinder side toward the outer cylinder.

7 Claims, 7 Drawing Sheets

LIQUID SEALING TYPE BODY MOUNT

BACKGROUND

The present invention relates to a liquid sealing type body mount provided between a body of a vehicle and a frame on a support side such as in a suspension or the like in order to support the body in a vibration-proof manner.

Heretofore, a body mount used in a rear suspension of a vehicle such as an automobile has been known in which there are provided an inner cylinder coupled to one of a body of the vehicle and a suspension-side frame for supporting the body, and an outer cylinder coupled to the other of them. The inner and outer cylinders are joined to each other by a rubber elastomer provided between them. Two liquid chambers, which are formed at portions opposed to each other with the aforesaid inner cylinder between, are provided between the inner and outer cylinders. The liquid chambers are communicated with each other by an orifice passage to obtain a vibration damping effect by liquid fluid effect between the two liquid chambers (for example, as shown in Japanese Patent Laid-Open Nos. Hei 2-38730 and Sho 62-188832).

However, in this conventional kind of body mount, it is general that a rubber portion forming an end wall in an axial direction of the aforesaid liquid chamber forms a right angle to an axis of the device.

In case that the thus structured mount is used with the aforesaid liquid chambers positioned respectively in front and back directions of the vehicle, a stable vibration-proof characteristic is obtained in some degree in upper and lower directions where the load of the body is applied, due to an effect of the decrease of moving spring constant. However, in front and back directions where a large vibration is applied at a time of acceleration, such as the starting time or at the braking time, the vibration damping effect becomes small due to rigidity of the rubber portion of the end wall of the aforesaid liquid chamber. For example, in the case that an attenuation coefficient at a frequency of 15 Hz is set to about 4N·s/mm, a moving spring constant at about 100 Hz becomes 2000N/mm and more, so that sufficient vibration-proof function does not act. Therefore, improvement is further desired.

SUMMARY OF THE INVENTION

The present invention has been made in view of the forgoing. Its objective is to provide a liquid sealing type body mount in which, with respect to vibration mainly in the front and back direction, for example, an attenuation coefficient at a frequency of 15 Hz is set to about 4N·s/mm, and a moving spring constant at about 100 Hz can be reduced to as low as about 1000N/mm, so that a sufficiently vibration-proof characteristic can be obtained.

The invention provides a liquid sealing type body mount provided between a body of a vehicle and a frame in order to support the body in a vibration-proof manner. The body mount comprises an inner cylinder fixed to one of the aforesaid body and a frame, an outer cylinder fixed to the other of them, a rubber elastomer that is provided between the inner and outer cylinders and which couples them to each other, two liquid chambers, which are formed at portions of the rubber elastomer opposed to each other with the aforesaid inner cylinder therebetween and formed between the inner and outer cylinders, and an orifice passage for communicating the liquid chambers with each other. Further, in the body mount in which a load input of the body is performed in the axial direction thereof, end walls in the axial direction in the aforesaid liquid chambers are formed of a rubber film which is a part of the aforesaid rubber elastomer, and the rubber film is formed aslant from the inner cylinder side toward the outer cylinder, that is, outward in the axial direction.

According to the above body mount, when vibrating power orthogonal to the axial center acts in the opposite direction of the two liquid chambers, since the rubber films forming the end walls in the axial direction of the liquid chambers are formed aslant, the vibration can be damped effectively by action of this rubber film. For example, at a frequency of 15 Hz, with a vibration coefficient of about 4N·s/mm, the moving spring constant can be reduced to as law as about 1000N/mm. Therefore, by using this body mount with the aforesaid liquid chambers positioned in the front and back directions of the vehicle, a good vibration-proof characteristic in relation to the vibration in the front and back directions and obliquely in the front and back directions can be obtained.

In the aforesaid body mount, it is particularly preferable that an angle of inclination of the end wall composed of the aforesaid rubber film in relation to the axial center is 15° to 70°.

Namely, in case that the angle of inclination is over or below the aforesaid range, the rigidity balance in the direction perpendicular to the axis and in the axial direction is lost respectively, and a bad influence is given to the vibration transmission in each direction. Therefore, it is preferable to set the angle of inclination in the aforesaid range, more preferably in a range of 30° to 69°.

In the aforesaid liquid sealing type body mount, the end walls, composed of the rubber films, extend from the inner cylinder side in the radial direction in substantially wavy shape to the outer cylinder in a direction expanded axially outward. In this case, similarly to the foregoing, the moving spring constant is reduced, and further a free length of the rubber film is extended to improve durability.

Further, it is preferable that the thickness of the end wall composed of the aforesaid rubber film is 2 to 6 mm. If the thickness of the end wall of the aforesaid rubber film is too thin, the pressure transmission efficiency of liquid decreases, so that the effect of liquid seal is difficult to produce. If the rubber film is too thick, the rigidity of the rubber portion increases and the vibration transmission to the liquid pressure decreases, so that the effect of liquid seal is difficult to produce.

Further, it is preferable that stoppers extending from the inner cylinder in the radial direction are provided in both the liquid chambers. The stopper prevents larger displacement than a predetermined displacement.

Particularly, it is preferable that the aforesaid stopper is formed by embedding a metal portion fixed to the inner cylinder in a rubber portion formed integrally with the rubber elastomer such that shock is softened when the stopper operates.

It is particularly preferable that an opening angle in the circumferential direction of the aforesaid liquid chamber is not less than 60° and not more than 140° since the area of the axial end wall of the rubber film can be made large and durability can be improved.

DESCRIPTION OF THE PREFERRED EMBODIMENTS

Figure 1:
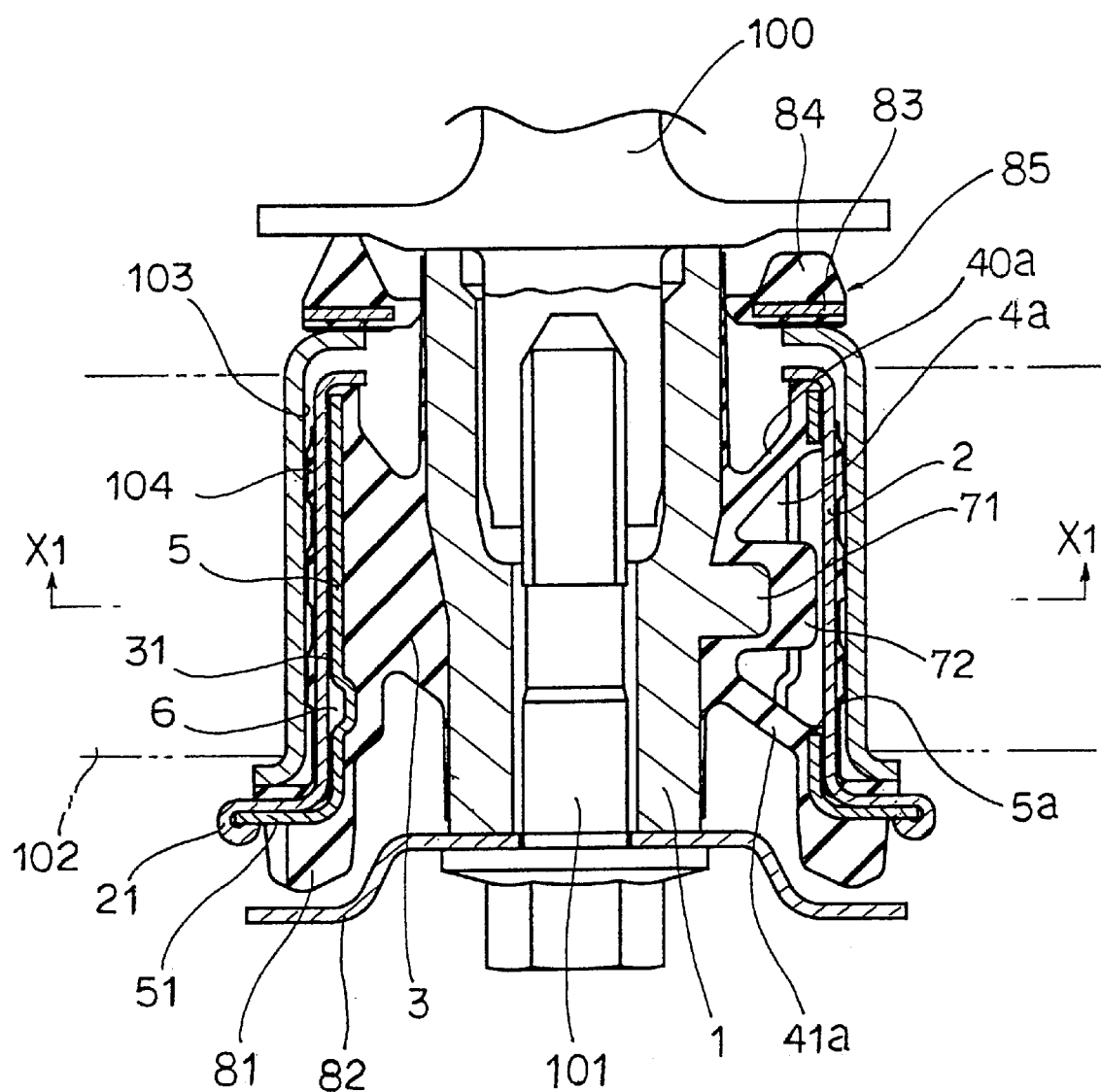
FIG. 1 is a longitudinal sectional view taken along a line of X-Y in FIG. 2, showing a first embodiment of a body mount of the present invention.
Figure 2:
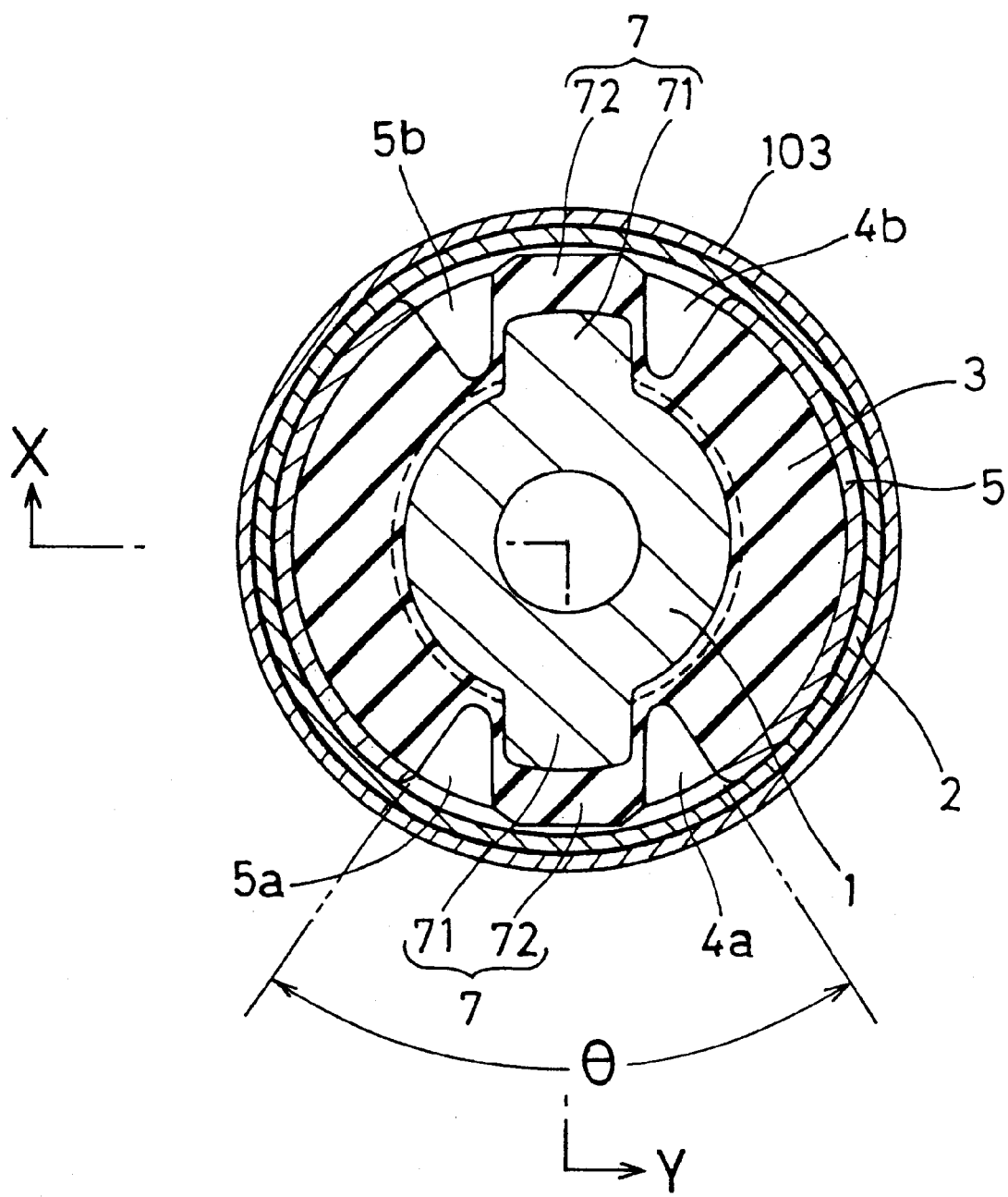
FIG. 2 is a sectional view taken along a line of X1—X1 in FIG. 1.
Figure 3:
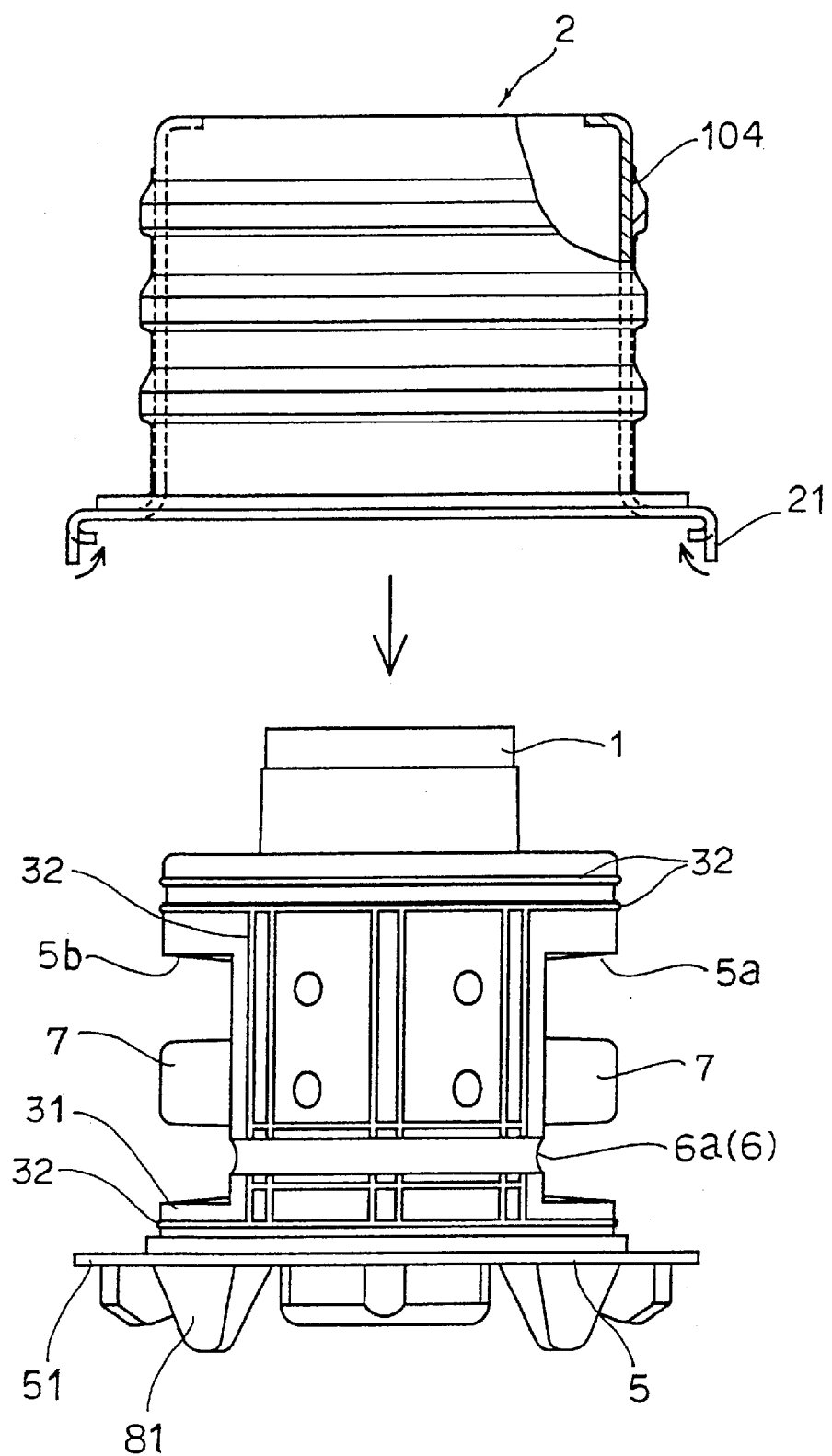
FIG. 3 is a partially cutaway exploded side view of the same in a state where an outer cylinder is separated from an inner cylinder.
Figure 4:
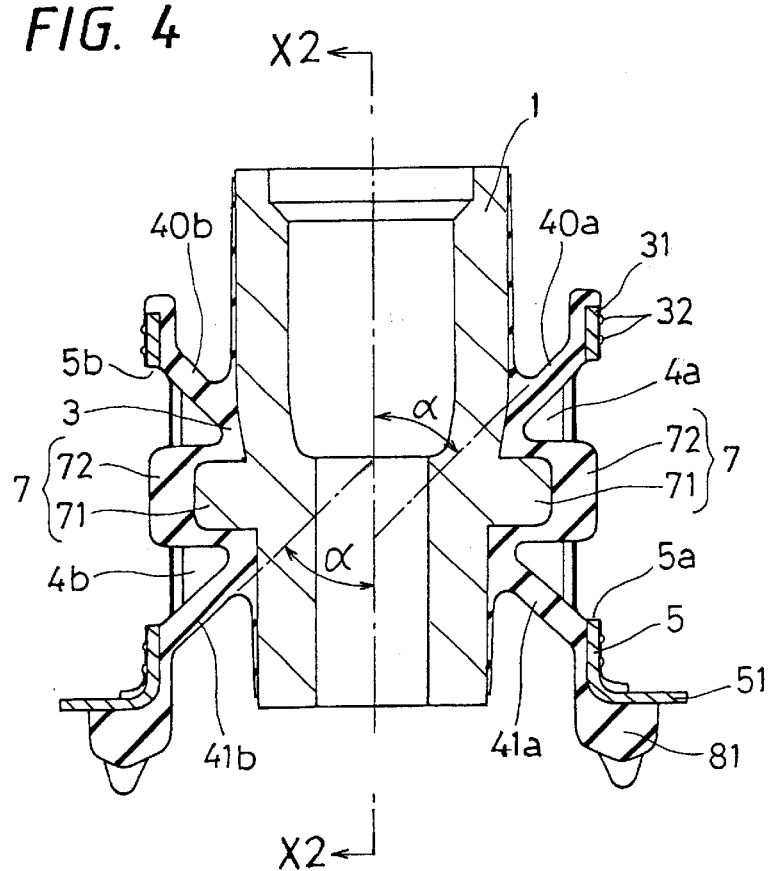
FIG. 4 is a longitudinal sectional side view omitting the outer cylinder.

Next, modes for carrying out the invention will be described with reference to embodiments shown in drawings.

In the figures, reference numeral 1 designates an inner cylinder to be coupled and fixed to a body of a vehicle through an attaching member 100 such as a body holder. The inner cylinder is formed in the shape of a comparatively thick cylinder and fixed to the attaching member 100 by a tightening member 101 such as a bolt. Reference numeral 2 designates an outer cylinder, which is attached and fixed through a rubber layer 104 to an annular attaching member 103 of a frame 102 on a support side such as a suspension for supporting the body by a forcing means, and which is nearly concentric with respect to the inner cylinder 1. These inner and outer cylinders 1 and 2 are usually made of metal such as aluminum material, steel or the like.

Reference numeral 3 designates a rubber elastomer provided between the inner cylinder 1 and the outer cylinder 2. Two liquid chambers 4a, 4b are formed between the inner and outer cylinders 1 and 2, open outwardly toward a periphery, and are provided at portions of the rubber elastomer 3, opposed to each other (symmetrical positions) with the inner cylinder 1 between. The liquid chambers 4a, 4b are communicated with each other by an orifice passage 6 which will be described later.

The aforesaid rubber elastomer 3 is adhered by vulcanization to the inner cylinder 1, and has an outer surface adhered by vulcanization to a middle cylinder 5 fitted inside the outer cylinder 2. The middle cylinder 5 has a flange portion 51 faced outward on a lower end side, and window-like openings 5a, 5b at portions corresponding to both the liquid chambers 4a, 4b. On a peripheral surface of the middle cylinder 5, a rubber layer 31 formed integrally with the rubber elastomer 3 is provided for sealing, a convex rib 32 is provided at a part of the rubber layer 31, and the middle cylinder 5 is air-tightly fitted inside the outer cylinder 2 by the rubber layer 31 and the convex rib 32, whereby the rubber elastomer 3 is provided between the inner cylinder 1 and the outer cylinder 2 and the liquid chambers 4a, 4b, in which liquid is sealed, are formed. The aforesaid outer cylinder 2 is caulked in a state where a flange 21 at the lower end portion thereof is fitted to the flange portion 51 of the middle cylinder 5.

Further, at the peripheral portion of the middle cylinder 5, a recess groove 6a is provided extending in the circumferential direction between the openings 5a and 5b. By fitting the outer cylinder 2 to the outside of the middle cylinder 5, the recess groove 6a functions as an orifice passage 6 for communicating the liquid chambers 4a and 4b to each other.

Each opening angle θ in the circumferential direction of the two liquid chambers 4a and 4b, that is, an opening angle θ of the liquid chamber defined by the opening 5a and 5b of the middle cylinder, can be set voluntarily according to desired characteristics. However, it is usually set in a range not less than 60° and not more than 140°. In this connection, the aforesaid opening angle θ is about 70° in this embodiment. From a viewpoint of durability and so on, it is preferably 80° or more.

Reference numeral 7 designates a stopper that protrudes in both the liquid chambers 4a and 4b from the inner cylinder 1 in the radial direction. When a large displacement in the protruding direction of the stopper 7 is produced, the stopper comes into contact with the chamber wall surface opposed to the stopper 7, that is, the inner surface of the outer cylinder 2, whereby a large displacement is controlled. The stopper 7 projects such that its leading end surface defines a small gap in relation to the chamber wall surface on the liquid chamber peripheral side or slightly comes into contact with the chamber wall surface. The gap between its leading end surface and the chamber wall surface is set to, for example, about 1 mm or less. For example, the aforesaid leading end surface may slightly come into contact with the chamber wall surface. Further, there is also an effect that the gap between its leading end surface and the chamber wall surface gives fluid resistance to the liquid at a time of vertical (axial) vibration.

The stopper 7 is usually formed, as shown in the figures, by embedding a metal portion 71 fixed to the inner cylinder 1 in a rubber portion 72 formed integrally with the rubber elastomer 3 so that the contact of the stopper 7 with the aforesaid chamber wall surface is elastically performed. To set the circumferential width of the stopper 7, including the metal portion 71, large can prevent excessive distortion and can improve durability.

In the body mount having the aforesaid constitution, both the end walls 40a, 41a; 40b, 41b in the axial direction of both the liquid chambers 4a, 4b mare formed of a rubber film formed integrally with the rubber elastomer 3 and have a predetermined thickness, and the rubber film slopes from the inner cylinder 1 to the outer cylinder 2 outward in the axial direction, extends nearly in line, and is coupled to the outer cylinder 2. Namely, as a whole, the liquid chambers 4a, 4b have a longitudinal section nearly in the shape of a Y on the periphery side. An angle of inclination of each of the end walls 40a, 41a; 40b, 41b in relation to the axial center is set in a range of 15° to 70°, and preferably in a range of 30° to 60°. Further, the thickness of each of the end walls 40a, 41a; 40b, 41b is set in a range of 2 to 6 mm.

Figure 5:
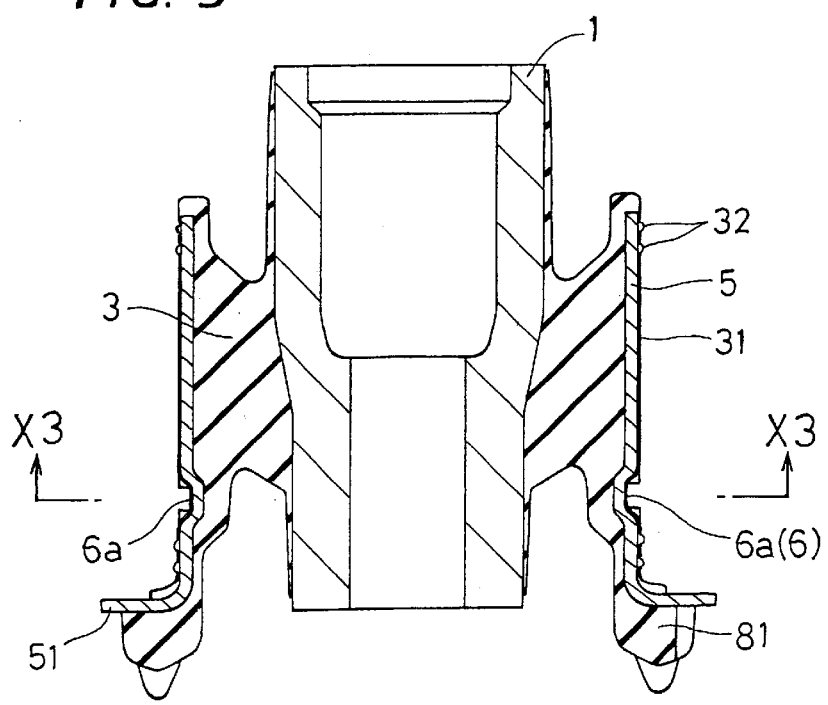
FIG. 5 is a sectional view taken along a line of X2—X2 in FIG. 4.
Figure 6:
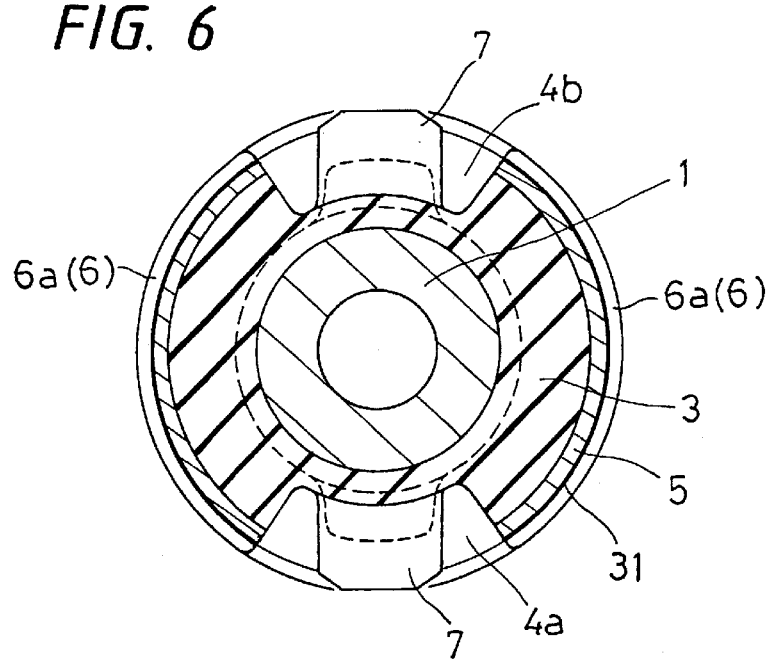
FIG. 6 is a sectional view taken along a line of X3—X3 in FIG. 5.
Figure 7:
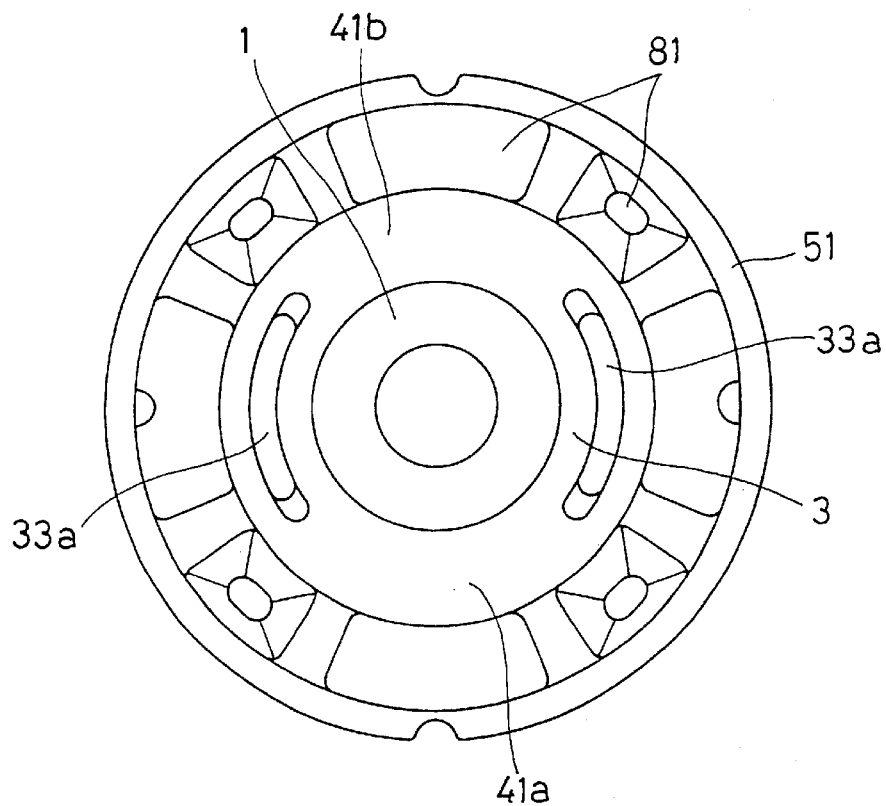
FIG. 7 is a bottom view of the same omitting the outer cylinder.

Further, both end surfaces in the axial direction of the rubber elastomer 3 between both the liquid chambers 4a and 4b are not limited to the linearly inclined surfaces similar to the outer surfaces of the end wall 40a, 41a; 40b, 41b composed of the rubber film or a wavy inclined surface. Particularly, the axial end surfaces of the rubber elastomer 3 on the downward side may be such concave surfaces that they form inclined surfaces reverse to the inclined surfaces of the end walls 41a, 41b, as shown in FIG. 5. Reference numeral 33a designates the concave portion in FIG. 7.

Further, on the lower surface of the flange portion 51 of the middle cylinder 5, a stopper rubber 81 formed integrally with the rubber elastomer 3 is provided by a vulcanizing adhesion means in order to control displacement large than a predetermined displacement by bringing a fitting plate 82, fixed to the lower end of the inner cylinder 1, into elastic contact with the stopper rubber 81 when the inner cylinder 1 moves upward a large distance with the vibration of the body. Further, in the mounted state of FIG. 1, the inner cylinder 1, upward of the attaching member 103, has a stopper member 85 fitted thereto. The stopper member has a stopper rubber 84 provided on a ring metal part 83. A o lower surface of the attaching member 100 comes into elastic contact with the stopper member 85 at the time of the downward displacement of the body to control a displacement larger than a predetermined displacement.

The thus structured liquid sealing type body mount of the invention is used in a rear suspension or the like of a vehicle such as an automobile as shown in FIG. 1 so that the inner cylinder 1 is fixed to the attaching member 100 on the body side by the tightening member 101, such as a bolt, and the outer cylinder 2 is forced in an attaching hole 103 of the attaching member 102 on the frame side of the suspension. Particularly, in this case, the body mount is attached so that each of the liquid chambers 4a and 4b are positioned in the front and back directions of the vehicle.

In the aforesaid use of the body mount, the moving spring constant in the vertical direction where the load of the body is applied can be lowered. Further; also in the front and back directions orthogonal to the axis center and obliquely in the front and back directions, where a large vibration is applied at time of acceleration or deceleration, such as a vehicle starting time or at the braking time, since the rubber films forming the end walls 40a, 41a; 40b, 41b in the axial direction of the liquid chambers 4a, 4b are formed obliquely, the rigidity in relation to the vibration in the aforesaid directions and the elasticity becomes smaller than in the case of the rubber film being orthogonal to the axial center, so that the moving spring constant is reduced by the effect of the rubber film, which heightens the vibration damping effect in cooperation with the liquid fluid effect between both the liquid chambers 4a and 4b.

For example, at a frequency of 15 Hz, in case of a damping coefficient of about 4N·s/mm, the moving spring constant at about 100 Hz can be reduced to as low as about 1000N/mm. Thus, a good vibration-proof characteristic in relation to the vibration in the front and back directions and obliquely in the front and back directions is obtained.

Figure 8:
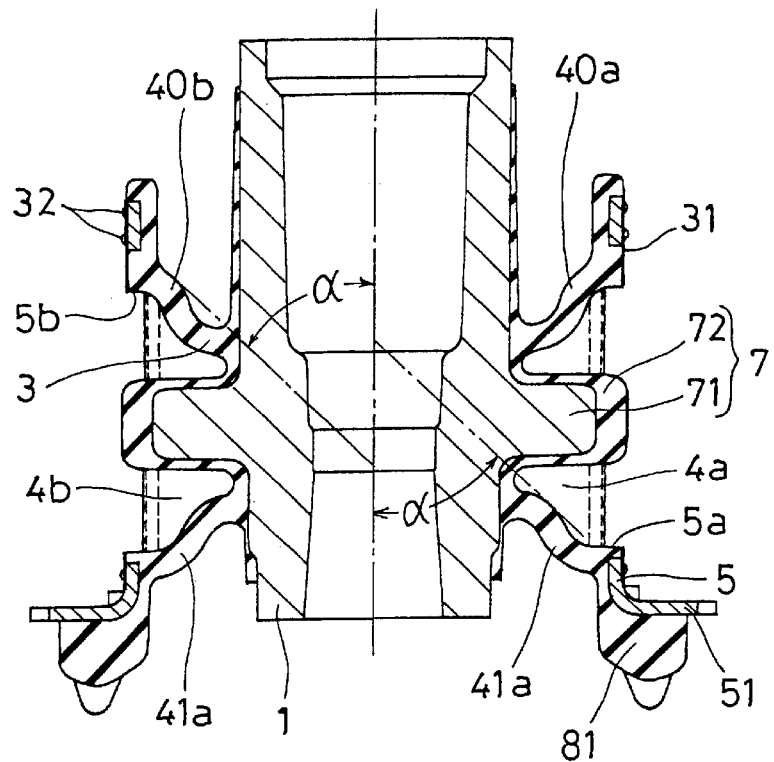
FIG. 8 is a longitudinal sectional view omitting an outer cylinder, showing a second embodiment of the invention.
Figure 9:
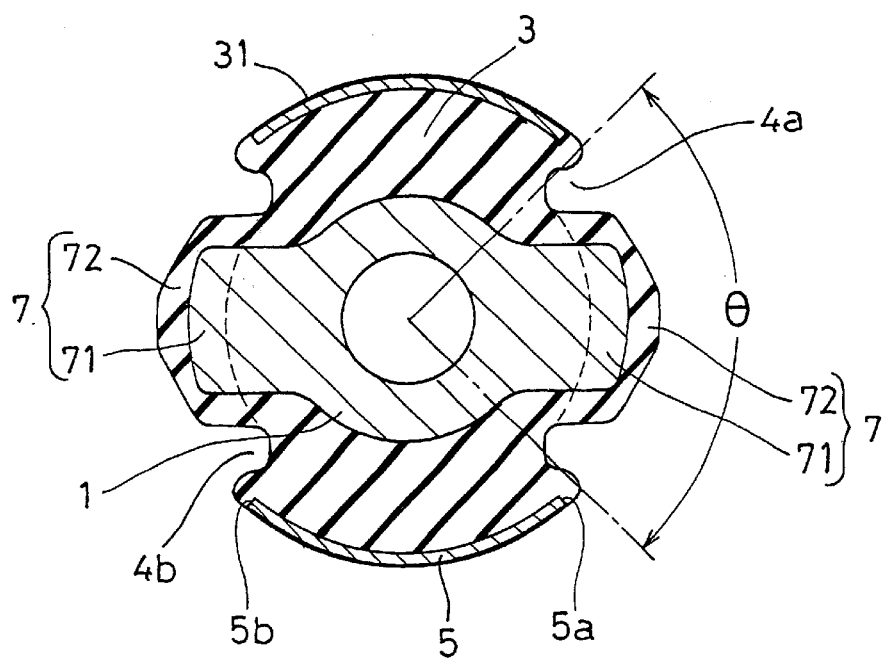
FIG. 9 is a transverse sectional view of the same including the outer cylinder.
Figure 10:
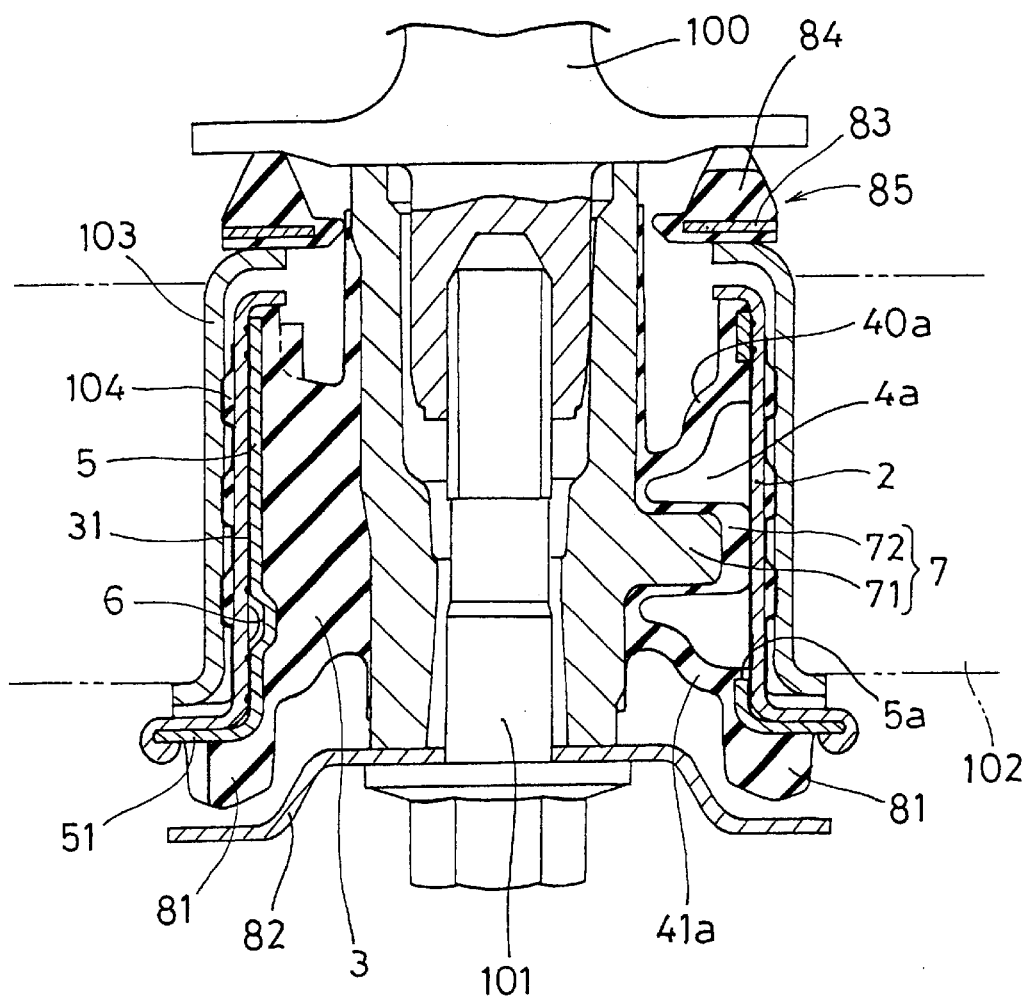
FIG. 10 is a longitudinal sectional view showing a mounted state of the body mount of FIG. 8

FIGS. 8 to 10 show a second embodiment of the invention, in which since its basic constitution is common to that of the above embodiment, the same components are denoted by the same reference characters and a detailed description of same is omitted.

In this embodiment, both end walls 40a, 41a; 40b, 41b extend from the inner cylinder 1 side in the radial direction so as form a substantially wavy shape comprising continuous curved surfaces having alternating reverse curvatures. The closer to the outer cylinder 2 side the end wall is, the more it is expanded outward in the axial direction. In this case, it is preferable that an angle of inclination of a line connecting joints at which each of the end walls 40a, 41a; 40b, 41b meets the inner cylinder 1 or the outer cylinder 2 in relation to the axial center is set in a range similar to that in the above first embodiment. Also, it is preferable to set the thickness of the end wall similarly.

In case that the end walls 40a, 41a; 40b, 41b are formed in the wavy shape, the free length of the rubber film forming the end wall is greater than when the end walls extend obliquely in line or in a slightly curved manner as shown in FIGS. 1 to 7, and thus stress at the time of distortion can be reduced and durability improves.

Further, in case of the embodiment shown in FIGS. 8 to 10, opening angles θ in the circumferential direction of both the liquid chambers 4a, 4b are set large to about 90° to 100°. By thus setting the opening angle θ large, preferably to 80° and more, the areas of the rubber films of the end walls 40a, 41a; 40b, 41b in the axial direction of the liquid chambers are made large, whereby durability can be further improved.

Further, in this embodiment, regarding a stopper 7 protruding from the inner cylinder 1 in the radial direction, an inner metal portion 71 and an outer rubber portion 72 are formed large in their circumferential width, so that the durability can be improved.

Also in this second embodiment, by attaching the body mount as shown in FIG. 10 and using it similarly to in the first embodiment, by the effect of the rubber films forming the respective end walls 40a, 41a; 40b, 41b in the axial direction of both the liquid chambers 4a, 4b, the moving spring constant can be reduced, and the vibration damping effect can be also heightened in cooperation with the liquid fluid effect between the liquid chambers 4a and 4b. Further, since the rubber film forming the aforesaid end wall is formed nearly in the wavy shape, the free length of the rubber film is long, and the area of the rubber film is large, the durability can be also improved greatly.

For example, in the case wherein a bench test corresponding to a real car run compared the body mount in the second embodiment, in which the end wall in the axial direction of the liquid chamber is formed nearly in the wavy shape, with the body mount in the first embodiment in which the end wall is formed linearly, it was found that the body mount in the second embodiment had four times or more as long a lifetime as that of the body mount in the first embodiment.

As described above, according to the liquid sealing type body mount of the invention, by using it with the axial center positioned in the vertical direction and with the two liquid chambers positioned in the front and back direction of the vehicle, in the front and back directions where the large vibration is applied at the accelerating time such as the vehicle starting time or at the braking time, the moving spring constant at about 100 Hz is reduced to as low as about 1000N/mm even in case that the damping coefficient at the frequency of 15 Hz is set to about 4N·s/mm, so that the large vibration damping effect and the sufficient vibration-proof characteristic can be obtained. Particularly, in case that the rubber film forming the end wall in the axial direction of the liquid chamber is formed nearly in the wavy shape, the durability is also improved.

What is claimed is:

1. A liquid sealing type body mount arrangement in a vehicle, comprising:

a vehicle body;

a frame for supporting said vehicle body;

an inner cylinder fixed to one of the vehicle body and the frame with an axis disposed substantially vertical;

an outer cylinder to be fixed to another one of the vehicle body and the frame;

a rubber elastomer between and elastically connecting said inner and outer cylinders such that a weight of said vehicle body is vertically supported in the axial direction of said inner and outer cylinders, said rubber elastomer defining first and second liquid chambers opposed to each other with said inner cylinder therebetween, said first and second liquid chambers being respectively disposed on a vehicle front side and a vehicle back side of the rubber elastomer;

an orifice passage for communicating the first and second liquid chambers with each other;

first and second opposing end walls of each of said first and second liquid chambers being formed of a rubber film, said first and second opposing end walls extending from axially inwardly disposed positions on said inner cylinder, relative to an axially central portion of said inner cylinder, to axially outwardly disposed positions at the outer cylinder, relative to an axially central portion of said outer cylinder, in a state absent of load, and said axially inwardly disposed positions being axially inwardly disposed relative to said axially outwardly disposed positions; and said first and second opposing end walls defining a distance in an axial direction therebetween which does not decrease as a radial outward distance thereof increases.

2. The liquid sealing type body mount arrangement in a vehicle according to claim 1, wherein said first and second end walls define an angle of inclination of lines, extending from said axially inwardly disposed positions to corresponding ones of said axially outwardly disposed positions, relative to an axis of said inner cylinder in a range of 15° to 70° when absent loading.

3. The liquid sealing type body mount arrangement in a vehicle according to claim 1, wherein said first and second end walls extend from the inner cylinder in a wave shape having alternating directions of curvature when absent loading.

4. The liquid sealing type body mount arrangement in a vehicle according to any one of claims 1 to 3, wherein a thickness of the first and second end walls is in a range of 2–6 mm.

5. The liquid sealing type body mount arrangement in a vehicle according to any one of claims 1 to 3, wherein stoppers extend from the inner cylinder in a radial direction of said first and second liquid chambers.

6. The liquid sealing type body mount arrangement in a vehicle according to claim 5, wherein said stoppers are formed by embedding a metal portion fixed to the inner cylinder in a rubber portion formed integrally with the rubber elastomer.

7. The liquid sealing type body mount arrangement in a vehicle according to any one of claims 1 to 3 wherein an opening angle in a circumferential direction of said first and second liquid chambers is not less than 60° and not more than 140°.

* * * * *